April 24, 1962  C. B. GOSMAN  3,030,640
INFLATED ARTICLES

Filed Jan. 13, 1960  2 Sheets-Sheet 1

INVENTOR.
CLARENCE B. GOSMAN
BY
B. P. Fishburn Jr.
ATTORNEY

April 24, 1962    C. B. GOSMAN    3,030,640
INFLATED ARTICLES

Filed Jan. 13, 1960    2 Sheets-Sheet 2

INVENTOR.
CLARENCE B. GOSMAN
BY
B. P. Fishburn, Jr.
ATTORNEY

United States Patent Office 3,030,640
Patented Apr. 24, 1962

3,030,640
INFLATED ARTICLES
Clarence B. Gosman, Brentwood, N.Y., assignor to Air Pillow & Cushions, Inc., a corporation of New York
Filed Jan. 13, 1960, Ser. No. 2,166
4 Claims. (Cl. 5—349)

This invention relates to inflated articles such as seat cushions, mattresses, life rafts, life jackets, sleeping bags and the like.

An object of the invention is to provide inflated articles of the above-mentioned character embodying a multiplicity of non-communicating inflated compartments, constructed and arranged in a novel and simplified manner.

A further object of the invention is to provide inflated articles of the above-mentioned character which are economical to manufacture and formed entirely of heat sealable plastics material and being extremely strong and durable in construction.

Another object of the invention is to provide inflated articles of the above-mentioned character which are highly buoyant in water and extremely safe for use as life rafts, life jackets and the like, due to the fact that the articles are composed of separate non-communicating inflated compartments whose individual puncturing and deflation will not result in the deflation of the other inflated compartments among the multiplicity of compartments with make up the inflated article.

Other objects and advantages of the invention will become apparent during the course of the following detailed description.

In the accompanying drawings, forming a part of this application, and in which like numerals are employed to designate like parts throughout the same, FIGURE 1 is a perspective view of an inflated article in accordance with one preferred embodiment of the invention.

Figure 1:
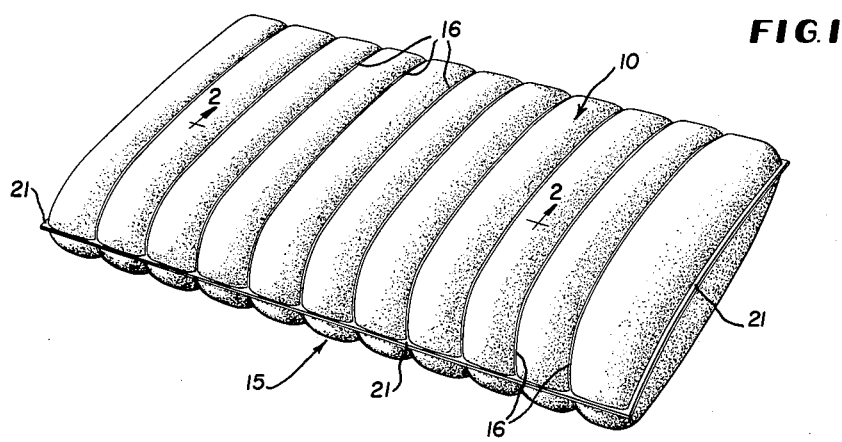
Figure 2:
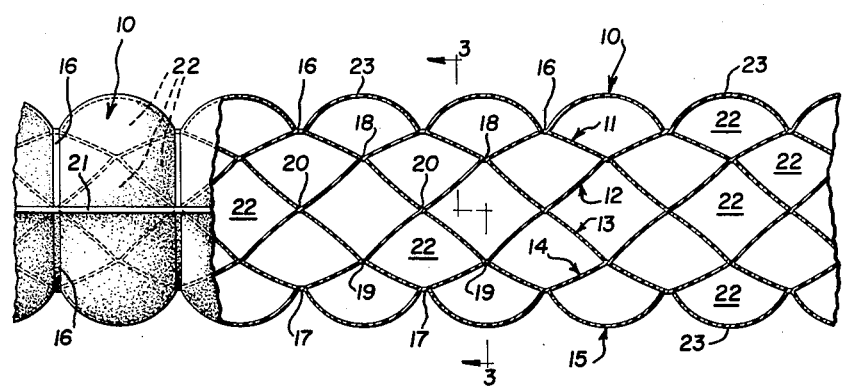
FIGURE 2 is an enlarged fragmentary vertical section taken on line 2—2 of FIGURE 1, partly in elevation.
Figure 3:
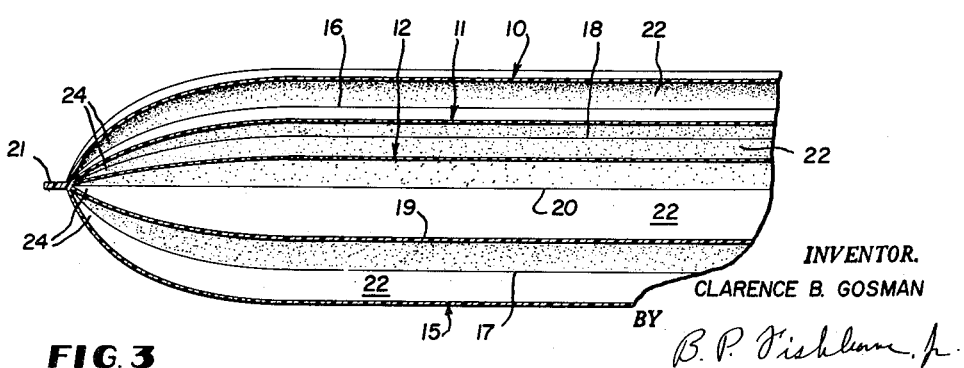
FIGURE 3 is a fragmentary vertical section taken on line 3—3 of FIGURE 2.

In the drawings, wherein for the purpose of illustration are shown preferred embodiments of the invention, attention is directed first to FIGURES 1 through 3, wherein the numerals 10 through 15 designate a plurality of initially flat superposed rectangular sheets of thin flexible plastics material, of a type which may be welded or heat sealed in assembly, by well known high frequency die means, similar to that shown in United States Patent 2,631,646.

The sheets 10 and 11 and 14 and 15 are permanently heat sealed together along equidistantly spaced parallel narrow areas or seams 16 and 17, which are disposed opposite each other on the exterior surfaces of the inflated article. The sheets 11 and 12 and 13 and 14 are likewise permanently heat sealed together along equidistantly spaced narrow seams 18 and 19, which are opposite one another, FIGURE 2, and staggered or offset with respect to the seams 16 and 17 and preferably midway between adjacent pairs of the latter. The innermost pair of sheets 12 and 13 are likewise permanently heat sealed together along equidistantly spaced parallel narrow seams 20, preferably in alignment with the seams 16 and 17, as shown in FIGURE 2.

The heat sealed seams 16 through 20 extend continuously in parallel relation for the entire width of the inflated article shown in FIGURE 1, which may be a rectangular seat cushion, mattress, life raft or the like.

Narrow marginal edge portions of the superposed rectangular sheets 10 through 15 are permanently heat sealed together around all four sides of the inflated circle, as indicated at 21 in the drawings.

The above-described superposed heat sealed sheets 10 through 15 form in the inflated article a multiplicity of separate non-communicating inflated tubular chambers 22, which assume the cross-sectional shapes shown approximately in FIGURE 2 when the compartments are inflated by automatic means, not shown, during the manufacture of the article. The compartments 22 are inflated automatically by the apparatus which are utilized to form the several heat sealed seams 16 through 20 and 21. Subsequent to manufacturing, the several compartments 22 remain permanently inflated and non-communicating due to the network of heat sealed seams previously described.

The compartments 22 are elongated and extend for the entire width of the inflated article shown in FIGURE 1. The outermost groups of compartments 22 adjacent the outermost sheets 10 and 15 are transversely rounded at their outer sides 23. The intermediate compartments 22 formed between the sheets 11, 12, 13 and 14 are generally rectangular in cross section as best shown in FIGURE 2.

As shown in FIGURE 3, the end portions of the several elongated chambers or pockets 22 taper somewhat as at 24, where the compartments converge toward the longitudinal marginal seams 21.

While I have shown a rectangular inflated article in FIGURE 1, composed of the six sheets 10 through 15, I wish to point out that it is not my intention to limit the article to any particular shape or to any particular number of superposed sheets. I contemplate making the inflated article from a lesser or greater number of sheets than the number shown in the drawings for the purpose of illustration, and I also contemplate making the article in shapes other than rectangular as indicated in FIGURE 1.

Additionally, it is not essential that the several compartments 22 extend continuously for the full width of the article shown in FIGURE 1, and if preferred, the several sheets 10 through 15 may be heat sealed together along a central longitudinal seam at right angles to the seams 16 through 20. If this is done, each tubular compartment 22 will be divided in half at or near its longitudinal center, with the resulting provision of twice as many compartments 22 in the finished article. The number of non-communicating inflated compartments 22 may be multiplied accordingly by the provision in the article of additional spaced parallel longitudinally extending heat sealed seams, at right angles to the seams 16 through 20.

In use, the article shown in FIGURES 1–3 may be employed as a seat cushion, bed mattress, life preserver or life raft, or the like depending upon its overall shape and size, which are variables.

When employed as a life raft, life preserver or the like, the buoyancy of the article will not be destroyed by the puncturing or deflation of one or more of the non-communicating compartments 22, as should be obvious. Even if a relatively large number of the compartments 22 should be punctured during use, the remaining multiplicity of inflated compartments will render the article highly buoyant for use as a life preserver or life raft. Correspondingly, puncturing of one or more of the compartments 22 will not destroy the overall utility of the article for use as an inflated mattress, seat cushion or the like.

Figure 4:
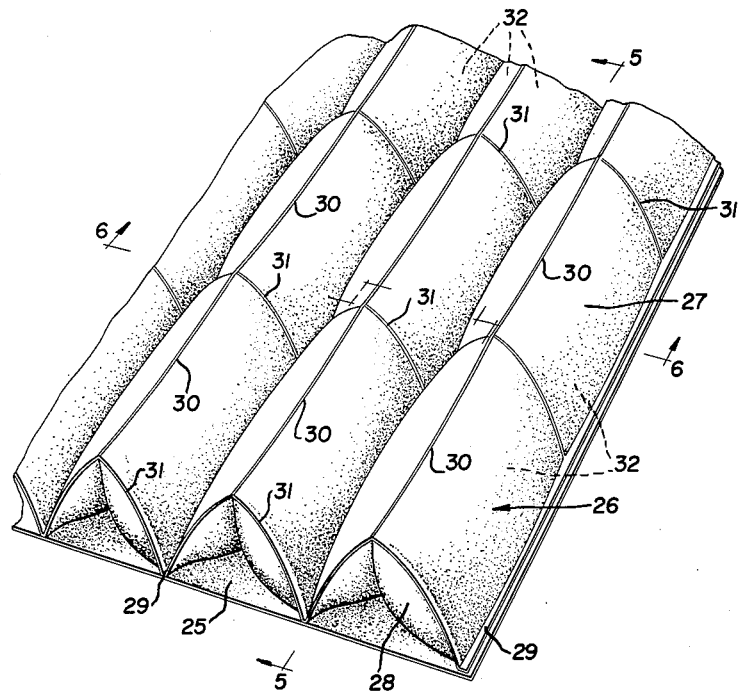
FIGURE 4 is a fragmentary perspective view of an inflated article according to a modification of the invention.
Figure 5:
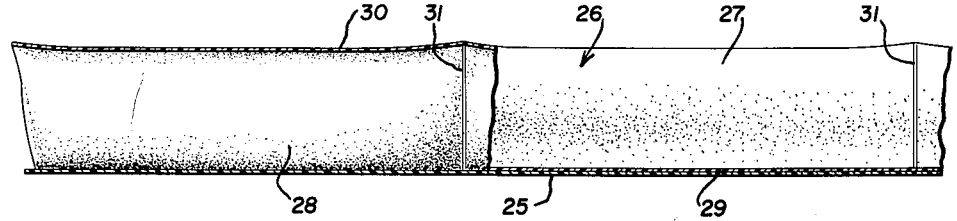
FIGURE 5 is a fragmentary vertical section taken on line 5—5 of FIGURE 4.
Figure 6:
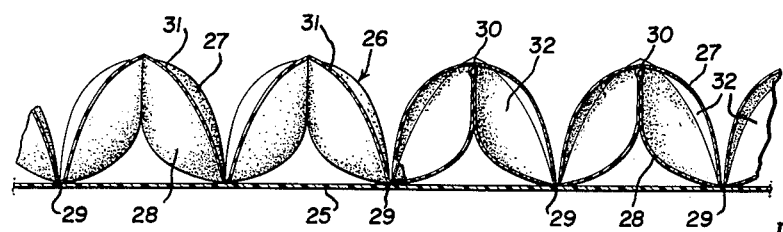
FIGURE 6 is a fragmentary vertical section taken on line 6—6 of FIGURE 4.

In FIGURES 4 through 6, there is shown a modification of the invention, particularly suitable for use as a life jacket, inflated sleeping bag or the like.

With reference to FIGURES 4 through 6, the numeral 25 designates a base sheet of thin flexible heat sealable plastics material, of the same type employed in the prior form of the invention.

Mounted upon one face of the flexible sheet 25 is an inflated body portion 26, comprising a pair of initially flat superposed sheets 27 and 28, heat sealed together and to the base sheet 25 along equidistantly spaced parallel narrow seams 29, extending continuously for the length of the article shown in FIGURE 4.

The sheets 27 and 28 are additionally heat sealed together midway between the seams 29 by parallel seams 30 and spaced parallel transverse seams 31, extending at right angles to the longitudinal seams 30.

The above-described arrangement of heat sealed seams 29, 30 and 31 forms between the flexible sheets 27 and 28 a multiplicity of elongated tubular separate and non-communicating compartments 32, which are inflated during the manufacturing of the article shown in FIGURE 4 by special apparatus, not shown in the drawings.

The article shown in FIGURE 4 may be manufactured as above-described in substantially any desired overall shape and size, so as to contain a desired number of the non-communicating inflated compartments 32, all arranged upon one side of the base sheet 25, as shown.

The article shown in FIGURE 4 is particularly well adapted for use as a buoyant life jacket or the like. The structure shown is also very suitable for use as a sleeping bag or heat insulating article of apparel, such as a jacket or coat.

The article shown in FIGURE 4 is flexible and may be readily folded or rolled along the longitudinal seams 29, with the flexible sheet 25 disposed inwardly with respect to the plane of curvature or folding, when the article serves as a jacket or is rolled into a tube-like configuration to serve as a sleeping bag or the like. The article of FIGURE 4 correspondingly resists folding or rolling along the seams 29 in the opposite direction with the flat sheet 25 disposed outermost with respect to the plane of curvature or folding. This renders the article of FIGURE 4 highly flexible when folded or rolled in one direction along the seams 29, and highly resistant to rolling or folding in the opposite direction along the seams 29.

It is to be understood that the forms of the invention herewith shown and described are to be taken as preferred examples of the same, and that various changes in the shape, size and arrangement of parts may be resorted to, without departing from the spirit of the invention or scope of the subjoined claims.

Having thus described my invention, I claim:

1. A lightweight flexible highly buoyant inflated structure adapted to be made in large sections and suitable for making life jackets and the like and capable of being formed into a roll, said structure comprising a flexible base sheet, and a plurality of side-by-side elongated hollow flexible inflated bodies secured to one side only of the base sheet along spaced parallel lines, each said body including a complementary pair of generally upstanding permanently inflated non-communicating body portions having their lower sides only hingedly secured to the base sheet and hinged to each other longitudinally at the tops of said body portions, each body portion having rounded side walls and said side walls converging toward the top and bottom longitudinal edges of the body portion, the inner side walls of each complementary pair of inflated body portions being in compressive contact for a portion only of the height of each hollow body and each pair of body portions defining between and below them and between said base sheet and each hollow body a tapering longitudinal passage which is entirely open, there being alternately arranged oppositely tapering open passages between each pair of inflated bodies on the sides thereof remote from the base sheet, the arrangement rendering said structure readily foldable and adapted to be rolled with the base sheet arranged innermost with respect to the plane of curvature for folding or rolling, said structure being resistant to folding and rolling in an opposite direction due to progressive contacting of said inflated bodies.

2. A light weight flexible buoyant inflated structure adapted to be formed in large sections and suitable for making life jackets and the like and also capable of being formed into a roll, said structure comprising a flexible base sheet, and a plurality of two-part hingedly connected permanently inflated non-communicating body portions arranged in side-by-side parallel relation at one side of the base sheet and floatingly secured thereto along spaced parallel lines only at the bottoms of said two-part inflated body portions, whereby said body portions stand elevated from said base sheet in spaced relation thereto and spaced from each other except along said lines, said parts of each two-part body portion being in compressive contact near and below the tops thereof and spaced apart at their bottoms.

3. The invention according to claim 2, and wherein said base sheet is formed of heat sealable plastics material and said inflated body portions are formed from a pair of superposed flexible sheets of heat sealable plastics material, said pair of sheets heat sealed to the base sheet along parallel lines at the longitudinal sides of the body portions and along parallel lines at the top of each two-part body portion.

4. A lightweight flexible buoyant inflated structure adapted to be formed in large sections and subsequently used for making life jackets and the like and capable of being readily rolled in one direction, said structure comprising a thin flexible base sheet, and a permanently inflated body secured to one side only of the base sheet and being substantially coextensive therewith, said inflated body including a multiplicity of elongated two-part inflated body portions arranged in side-by-side parallel relation upon the base sheet, said two-part body portions hingedly secured to the base sheet along parallel spaced lines only and projecting upwardly from such lines and base sheet to form spaces between the two-part body portions and the base sheet, each two-part body portion tapering away from the base sheet to provide tapered recesses between the body portions.

References Cited in the file of this patent

UNITED STATES PATENTS

| | | |
|---|---|---|
| 1,146,615 | Dodd | July 13, 1915 |
| 2,077,233 | Greenhill | Apr. 13, 1937 |
| 2,575,764 | Morner | Nov. 20, 1951 |
| 2,715,231 | Marston | Aug. 16, 1955 |
| 2,748,401 | Winstead | June 5, 1956 |
| 2,834,970 | Nappe | May 20, 1958 |